US011494568B1

(12) United States Patent
Brandt et al.

(10) Patent No.: US 11,494,568 B1
(45) Date of Patent: Nov. 8, 2022

(54) TEXT VERTICALIZATION CATEGORIZATION

(71) Applicant: SAP SE, Walldorf (DE)

(72) Inventors: Lauritz Brandt, Walldorf (DE); Marcus Danei, Plankstadt (DE); Benjamin Schork, Wilhelmsfeld (DE)

(73) Assignee: SAP SE, Walldorf (DE)

( * ) Notice: Subject to any disclaimer, the term of this patent is extended or adjusted under 35 U.S.C. 154(b) by 78 days.

(21) Appl. No.: 17/229,987

(22) Filed: Apr. 14, 2021

(51) Int. Cl.
*G06F 40/58* (2020.01)
*G06F 40/279* (2020.01)
*G06F 40/166* (2020.01)

(52) U.S. Cl.
CPC ............ *G06F 40/58* (2020.01); *G06F 40/166* (2020.01); *G06F 40/279* (2020.01)

(58) Field of Classification Search
CPC ....... G06F 40/58; G06F 40/166; G06F 40/279
USPC .......................................................... 704/3
See application file for complete search history.

(56) References Cited

U.S. PATENT DOCUMENTS

2021/0286670 A1* 9/2021 Rooney ............... G11C 11/4087

\* cited by examiner

*Primary Examiner* — Thierry L Pham
(74) *Attorney, Agent, or Firm* — Buckley, Maschoff & Talwalkar LLC (57) ABSTRACT

Systems and methods include acquisition of a plurality of text segments, each of the text segments associated with a flag value indicating whether the text segment is associated with a correct replacement text or an incorrect replacement text, determination of one or more n-grams of each text segment of the plurality of text segments, generation, based on the one or more n-grams of each text segment and the flag value associated with each text segment, a model to determine a flag value based on one or more input n-grams, reception of an input text segment, determination of a second one or more n-grams of the input text segment, determination, using the model, of an output flag value based on the determined second one or more n-grams, and presentation of the input text segment and the output flag value on a display.

18 Claims, 9 Drawing Sheets

| Translated Text | Proposed Replacement Text | Flag Value | Verticalize? |
|---|---|---|---|
| 'plant | 'site | Y | ☑ |
| 'plant' | 'site' | Y | ☐ 730 |
| (listing/mat.plng) | (listing/req.plng) | O | ☐ |
| (materials planning) | (reqrmnts planning) | O | ☐ |
| /Matl Grp | /Mdse Cat | Y | ☐ |
| /Mrial | /Atrcl | O | ☐ |
| /mat. planning | /req. planning | Y | ☐ |

| 3-GRAMS | O FLAG VALUES | Y FLAG VALUES | RATIO |
|---|---|---|---|
| ABC | 7 | 2 | .286 |
| BC1 | 9 | 3 | .333 |
| C12 | 5 | 1 | .200 |
| BC2 | 1 | 8 | 8.000 |
| C23 | 4 | 12 | 3.000 |
| 233 | 7 | 9 | 1.286 |
| 334 | 6 | 2 | .333 |
| 456 | 4 | 1 | .250 |

TEXT VERTICALIZATION CATEGORIZATION

BACKGROUND

Modern computing systems store vast amounts of data for their respective enterprises. Users execute software applications to access, process and visualize this data. Due to increasing globalization of company workforces, it is often desirable to translate the texts used within software applications so the applications may be effectively used by speakers of different several languages.

Systems are available for automating such text translation. For example, a translation system may access a multilingual text repository (MLTR) to translate input texts in a first language (e.g., German) to output texts in a second language (e.g., French). An MLTR may include industry-specific multilingual text associations, such that a first German word may be translated to a first French word if the translation is associated with a first industry and to a second French word if the translation is associated with a second industry. These translation systems may additionally or alternatively utilize machine-learned translation processes and/or a company-specific MLTR.

Some translation scenarios require verticalization of translated text. Verticalization describes a monolingual translation process, in which a first word in a first language (e.g., "article") is replaced with a second word in the first language (e.g., "material"). Conventional verticalization utilizes a rule-based system, which is typically error-prone and produces unacceptable results. Consequently, to ensure quality standards, a human is required to review a list of the replaced terms after verticalization.

Figure 1:
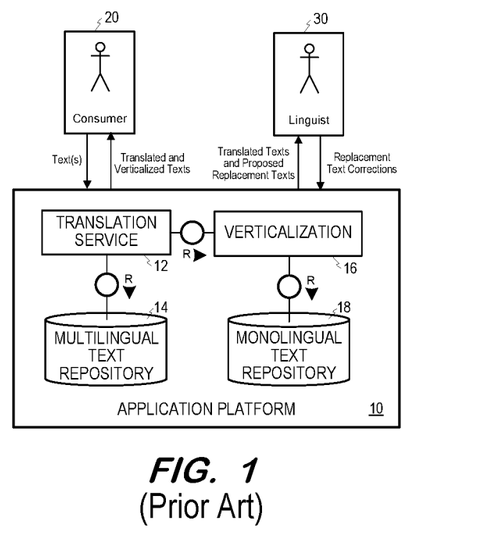
FIG. 1 is a block diagram of a prior art system to translate and verticalize texts.

FIG. 1 illustrates a prior art system for translation and verticalization. According to the illustrated example, application platform 10 executes translation service 12 and verticalization component 16. Consumer 20 passes texts to translation service 12, which determines corresponding translated text based on MLTR 14. Translation service 12 then accesses verticalization component 16, which determines proposed replacement text for one or more of the translated texts based on pre-defined rules and associations stored in monolingual text repository 18.

Linguist 30 may receive the translated texts and any proposed replacement texts. Linguist 30 reviews the proposed replacement texts and determines whether any of the proposed replacement texts should be corrected. Linguist 30 transmits indications of corrections to translation service 12, which applies the corrections to the proposed replacement texts and returns the thusly-translated and verticalized texts to consumer 20.

Systems are desired to reduce the amount of human effort required in conjunction with verticalization.

DETAILED DESCRIPTION

The following description is provided to enable any person in the art to make and use the described embodiments and sets forth the best mode contemplated for carrying out some embodiments. Various modifications, however, will be readily-apparent to those in the art.

Some embodiments operate to train a system to predict whether to verticalize translated text. Briefly, some embodiments utilize training data including translated text and, for each translated text, a flag indicating whether a decision to verticalization was correct (i.e., whether the translated text was correctly verticalized). A model is trained based on the training data to map text features to respective flag values. The text features may comprise n-grams according to some embodiments. The model may comprise a neural network, a statistical model, or any other suitable model.

Figure 2:
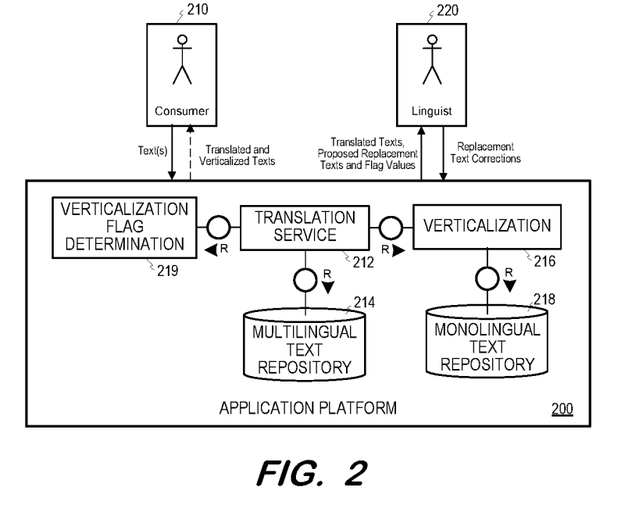
FIG. 2 is a block diagram of a system to translate and verticalize texts according to some embodiments.

FIG. 2 is a diagram of a system to translate and verticalize texts according to some embodiments. The illustrated components of FIG. 2 may be implemented using any suitable combination of computing hardware and/or software that is or becomes known. Such a combination may include cloud-based implementations which apportion computing resources elastically according to demand, need, price, and/or any other metric. In some embodiments, two or more components are implemented by a single computing device. Components may be co-located and/or implemented as a cloud service (e.g., Software-as-a-Service, Platform-as-a-Service).

Generally, consumer 210 transmits one or more texts to application platform 200 for translation. Application platform 200 may comprise an on-premise or cloud-based server providing an execution platform and services to applications such as translation service 212. Translation service 212 utilizes MLTR 214 to determine corresponding translated texts. As described above, translation service 212 may also or alternatively use machine-learned translation processes or a company-specific MLTR to determine the translated texts.

Translation service 212 provides the translated texts to verticalization component 216, which determines proposed replacement text for one or more of the translated texts based on pre-defined rules and associations stored in monolingual text repository 218. The translated texts for which proposed replacement text has been determined are provided to verticalization flag determination component 219. Verticalization flag determination component 219 has been trained as will be described in detail below to generate a flag value based on input text. The flag value generated for a given text is intended to predict whether the proposed replacement text determined by verticalization component 216 for the given text is correct (flag value=Y) or not (flag value=O).

Linguist 220 receives the translated texts, the proposed replacement texts, and the flag values for review. According to some embodiments, linguist 220 receives only the translated texts for which proposed replacement text has been determined, and the proposed replacement text and flag value for each of such translated texts. Linguist 220 reviews the translated texts and proposed replacement texts and determines whether any of the proposed replacement texts are incorrect.

Linguist 220 may advantageously refer to the flag value associated with each proposed replacement text during this determination. In one example, linguist 220 reviews only those proposed replacement texts which are associated with flag value O, and assumes that the proposed replacement texts which are associated with flag value Y are correct. In other examples, linguist 220 reviews all proposed replacement texts but gives particular attention to proposed replacement texts which are associated with flag value O while quickly reviewing proposed replacement texts which are associated with flag value Y. Consequently, the flag values may serve to reduce the amount of human effort and time required to review proposed replacement texts during a verticalization process, and/or to provide improved verticalization for a given amount of human effort and time.

Linguist 220 transmits corrections to the proposed replacement texts to translation service 212. The corrections are applied to the proposed replacement texts to generate translated and verticalized texts, which are then returned to consumer 210.

Figure 3:
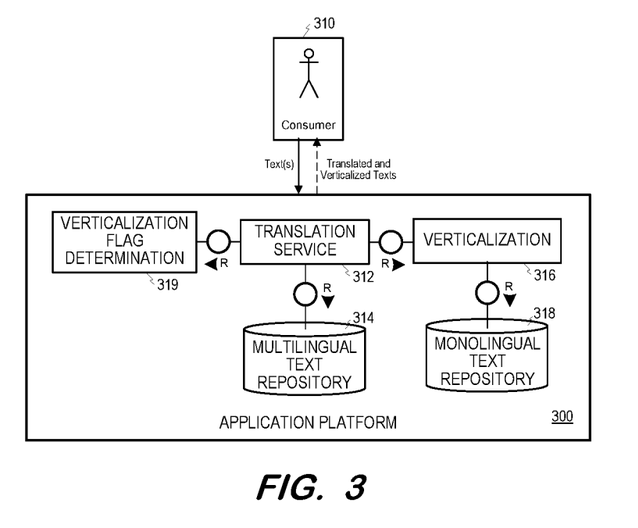
FIG. 3 illustrates verticalized texts and corresponding flag values according to some embodiments.

FIG. 3 presents a scenario which reduces a need for human review of whether or not to verticalize translated texts. As shown, consumer 310 transmits one or more texts to translation service 312 of application platform 300. Translation service 312 determines corresponding translated texts using MLTR 314 (and/or machine-learned translation processes or a company-specific MLTR).

Translation service 312 provides the translated texts to verticalization component 316, which determines proposed replacement text for one or more of the translated texts based on monolingual text repository 318. Verticalization flag determination component 319 then determines a flag value for each translated text for which proposed replacement text has been determined, where the flag value predicts whether the proposed replacement text for the translated text is correct (flag value=Y) or not (flag value=O).

In contrast to the system of FIG. 2, translation service 312 may automatically (i.e., without human intervention) finalize the verticalization process based on the determined flag values. Specifically, proposed replacement text associated with a flag value Y replaces corresponding translated text, while proposed replacement text associated with a flag value O is ignored (i.e., the corresponding translated text is not replaced). The thusly-translated and verticalized texts are then returned to consumer 310.

A consumer may transmit texts to an application platform by consuming application programming interface methods provided by a translation service or using integrated workflow scenarios provided by the application platform. Such integrated workflow scenarios may allow management of text translation from various development environments on a single user interface. A consumer and/or linguist may review and edit translated and verticalized texts, and transfer the edited translated and verticalized texts to a source development environment via the user interface.

Figure 4:
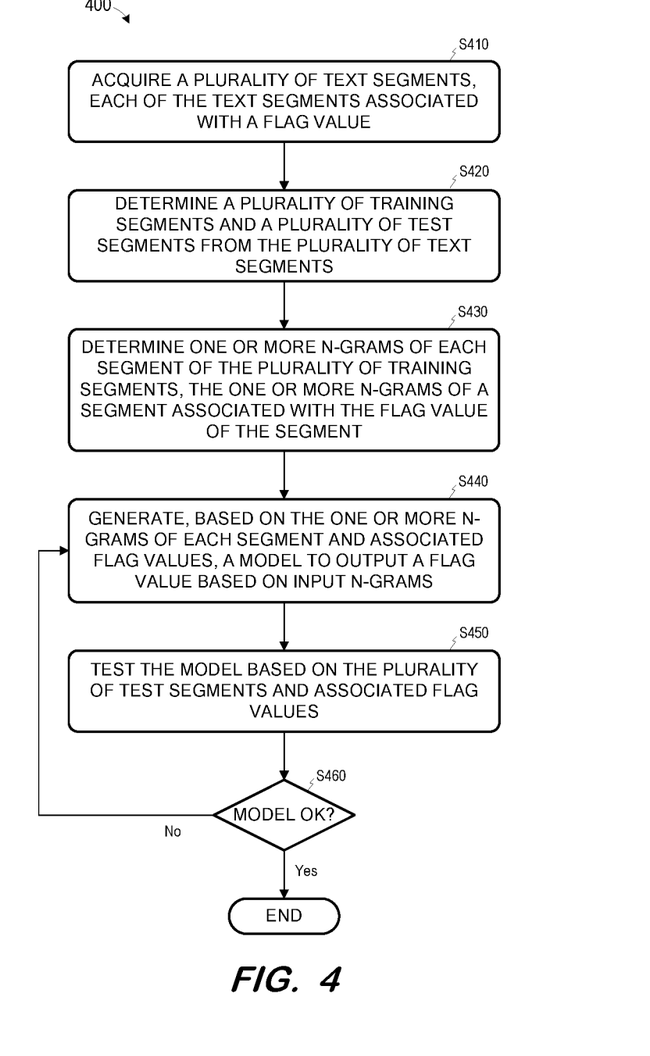
FIG. 4 is a flow diagram of a process to generate a model to output a flag value based on one or more n-grams according to some embodiments.

FIG. 4 comprises a flow diagram of process 400 to generate a model to output a flag value based on one or more n-grams according to some embodiments. Process 400 and all other processes mentioned herein may be embodied in executable program code read from one or more of non-transitory computer-readable media, such as a hard disk drive, a volatile or non-volatile random access memory, a DVD-ROM, a Flash drive, and a magnetic tape, and then stored in a compressed, uncompiled and/or encrypted format. Such program code may be executed by a processing unit including one or more processors, processor cores, and/or execution threads. In some embodiments, hard-wired circuitry may be used in place of, or in combination with, program code for implementation of processes according to some embodiments. Embodiments are therefore not limited to any specific combination of hardware and software.

Initially, a plurality of text segments are acquired at S410. Each of the text segments is associated with a flag value. These (text segment, flag value) pairs may comprise historical data associated with previously-executed verticalization processes.

As described with respect to FIGS. 1 and 2, a verticalization process may include providing a linguist with a set of translated texts and proposed replacement texts for one or more of the translated texts. The linguist indicates whether or not the proposed replacement texts are correct and the verticalization process is finalized based on the indications. S410 may therefore comprise acquiring historical translated texts and indications which were previously-determined for the proposed replacements of the translated texts. For example, during a prior verticalization, a replacement text "material" was proposed for the translated text "article". A linguist then determined that the proposed replacement was correct and associated the translated text "article" and the proposed replacement text "material" with a flag value "Y". This association is stored along with other historical associations. S410 may therefore comprise acquiring the pair (article, Y) and other (text segment, flag value) pairs from such historical associations.

At S420, a plurality of training segments and a plurality of test segments are determined from the acquired plurality of text segments. Generally, the plurality of training segments will be used to train a model and the plurality of test segments will be used to evaluate a performance of the trained model. In some embodiments, the plurality of training segments comprise a random 90% of the acquired plurality of text segments and the plurality of testing segments comprise a random 10% of the acquired plurality of text segments.

Figure 5:
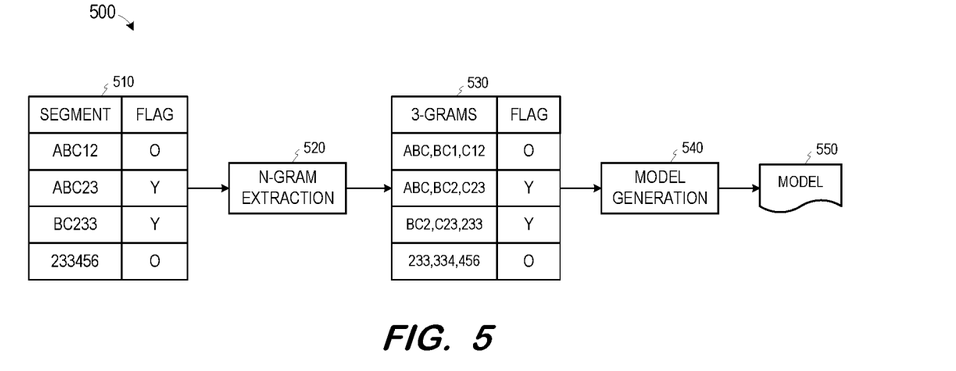
FIG. 5 is a diagram illustrating generation of a model to output a flag value based on one or more n-grams according to some embodiments.

One or more n-grams of each training segment is determined at S430. Each of the one or more n-grams determined for a given training segment is associated with the flag value of the given training segment. FIG. 5 is a block diagram of system 500 illustrating elements of process 400 according to some embodiments. It will be assumed that (text segment, value) pairs 510 were acquired at S410, although implementations will likely include acquisition of a large number of such pairs.

N-gram extraction component 520 may operate to extract n-grams from each text segment of pairs 510. Component 520 may extract any-sized n-grams (i.e., unigrams, bigrams, tri-grams, etc.) and may extract positional n-grams according to some embodiments. In the example of system 500, S430 comprises determination of 3-grams. Accordingly, data 530 shows 3-grams determined for each segment of pairs 510, with the 3-grams determined for a segment being associated with the flag value of the segment.

Next, at S440, a model is generated based on the one or more n-grams of each segment and associated flag values. Model generation component 540 of FIG. 5 is shown generating model 550 based on data 530. The generated model is intended to output a flag value based on input n-grams. As will be described below, the model may be generated based on statistics derived from the training segments and flag values, may be a neural network trained based on the training segments and using the flag values as ground-truths, or may comprise any other type of model that is or becomes known.

The generated model is tested at S450 based on the plurality of test segments. Such evaluation is known in the art, and generally includes using the model to predict a flag value for each of the plurality of test segments, and comparing the predictions to the actual flag values associated with each of the plurality of test segments to determine performance metrics of the model.

At S460, it is determined whether the performance metrics are satisfactory. If not, flow returns to S440 to generate a new model based on the n-grams of the training segments and their associated flag values. Model generation may proceed differently than previously in order to produce a new model for evaluation at S450. For example, successive model generations may employ different thresholds, a different model architecture and a different loss function than used to generate a prior model.

Figure 6:
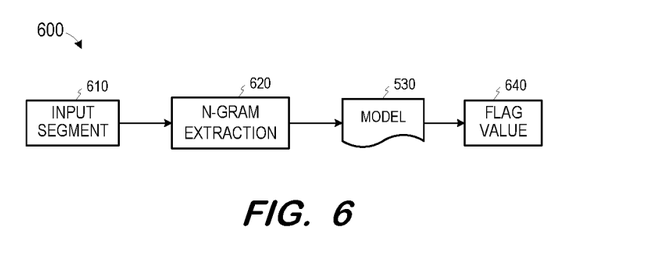
FIG. 6 is a diagram illustrating deployment of a model to output a flag value based on an input segment according to some embodiments.

Flow terminates if it is determined at S460 that the performance metrics are satisfactory. The model may then be deployed in a system such as shown in FIG. 2 or FIG. 3. FIG. 6 illustrates such a deployment according to some embodiments. As shown, input segment 610 may comprise a translated text. N-gram extraction component 620 of system 600 extracts n-grams from input segment 610 as is known in the art, which are of the type of n-grams used to generate model 530. Since model 530 in the present example was generated based on 3-grams, n-gram extraction component 620 extracts 3-grams from input segment 610.

Model 530 receives the 3-grams and, as it was generated to do, outputs flag value 640 based thereon. Input segment 610, a proposed replacement of input segment 610 generated by verticalization component 216/316, and flag value 640 may then be used to finalize verticalization. Such finalization may consist of presentation of this information to a linguist as described with respect to FIG. 2 or use of this information to automatically finalize verticalization as described with respect to FIG. 3.

Figure 7:
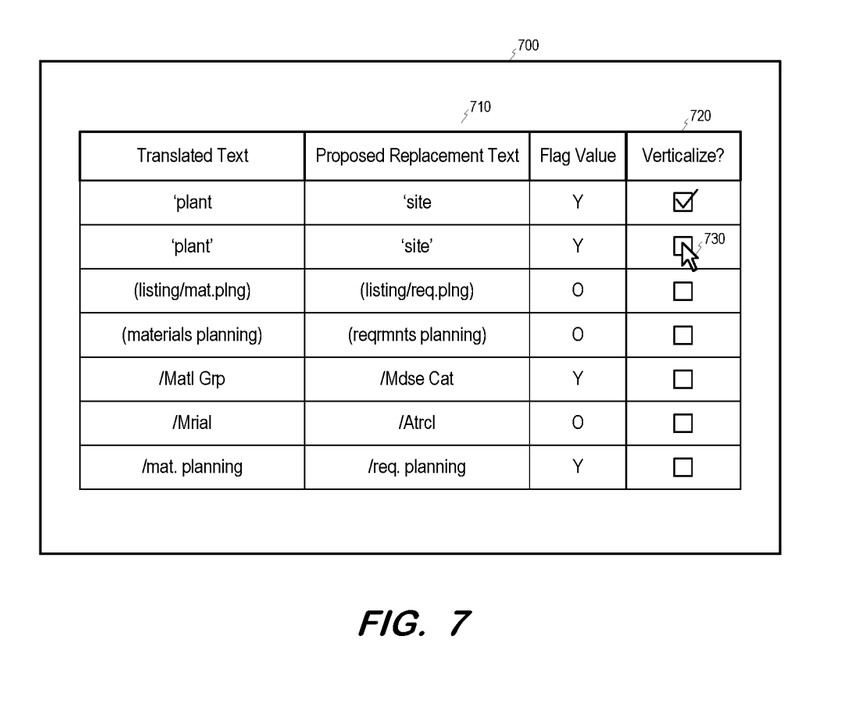
FIG. 7 is a view of a display presenting a user interface for evaluating proposed replacement texts according to some embodiments.

FIG. 7 is an outward view of display 700 presenting a user interface including table 710 according to some embodiments. As shown, each row of table 710 includes translated text (e.g., translated from an input text of a different language provided by a consumer), corresponding proposed replacement text (e.g., generated by a verticalization process) and a flag value. The flag value was generated by a trained model based on the translated text as described herein and illustrated in FIG. 6.

In the illustrated embodiment, a linguist manipulates cursor 730 to select checkboxes of column 720 which correspond to proposed replacement texts which should replace their associated translated texts. The linguist may use the flag values to assist the determination of whether to replace each translated text with its associated proposed replacement text. It should be noted that selection of the checkboxes generates new (text segment, flag value) pairs which may be subsequently used to train a new model as described above.

Figure 8:
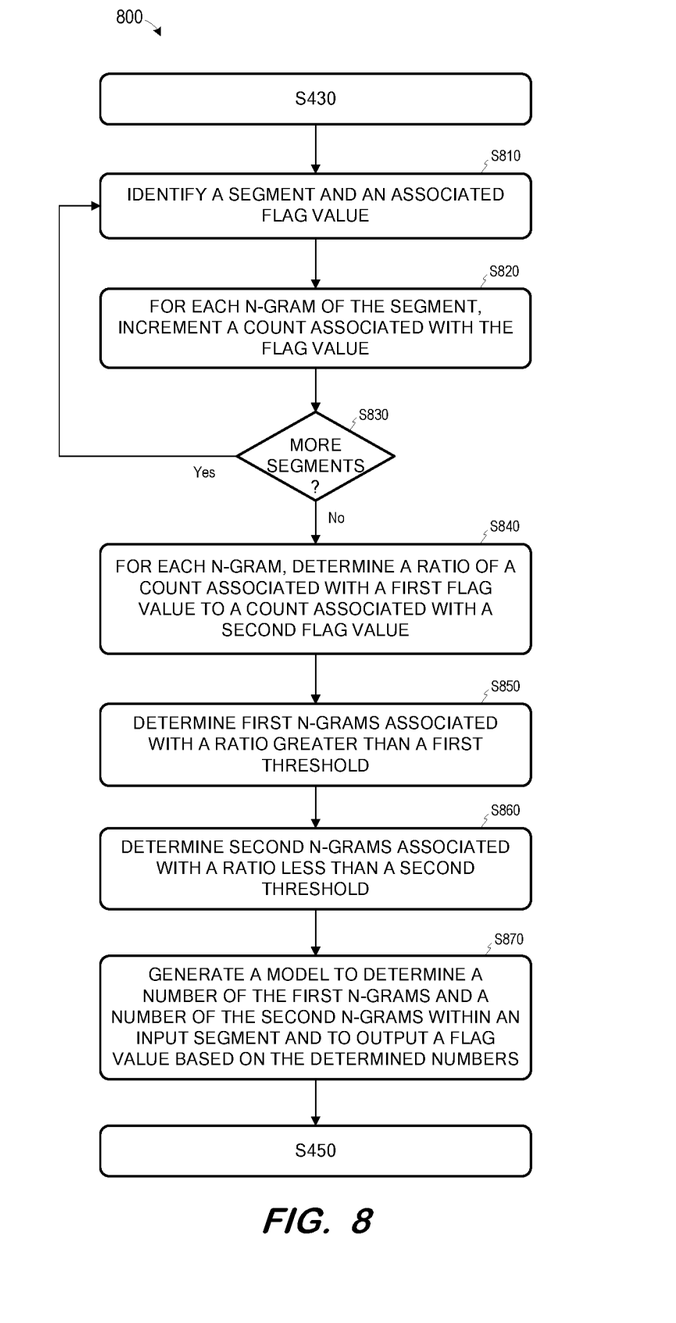
FIG. 8 is a flow diagram of a process to generate a model to output a flag value based on one or more n-grams according to some embodiments.

FIG. 8 is a flow diagram of process 800 to generate a model at S440 according to some embodiments. Generally, process 800 learns, based on previously human-generated classifications (i.e., flag values) corresponding to segments and proposed replacements, which n-grams are indicative of a good replacement and which n-grams are indicative of a bad replacement. Based thereon, a flag value indicating whether a proposed replacement for a new segment is a good replacement or a bad replacement may be predicted by determining how many n-grams of either class (i.e., good or bad) of n-grams the segment contains, and assigning a flag value based on whichever number is greater.

Flow begins at S810, after determination of one or more n-grams of each of the plurality of training segments at S430. At S810, one of the plurality of training segments is identified, along with its associated flag value. Next, and for each determined n-gram of the segment, a count associated with the flag value is incremented at S820.

In one example, the segment "ABC12" and its associated flag value O of pairs 510 are identified at S810. Each n-gram of ABC12 (i.e., "ABC", "BC1", "C12") is associated with a count for the flag value O and a count for flag value Y, both initialized to 0. Since the identified segment ABC12 is associated with the flag value O, the flag value O count for each n-gram is incremented at S820. Flow cycles through S810 and S820 for each segment of the training segments.

Once it is determined at S830 that all training segments have been identified, each n-gram of each training segment is associated with a count value for each of flag values Y and O. Table 800 of FIG. 8, for example, illustrates various n-grams 802 and associated counts 804 and 806 which may be generated via multiple iterations of S820 according to an example.

For each n-gram, a ratio of its count associated with a first flag value to its count associated with a second flag value is determined at S840. Table 800 also illustrates ratios 808 determined at S840 according to some embodiments.

Figure 9:
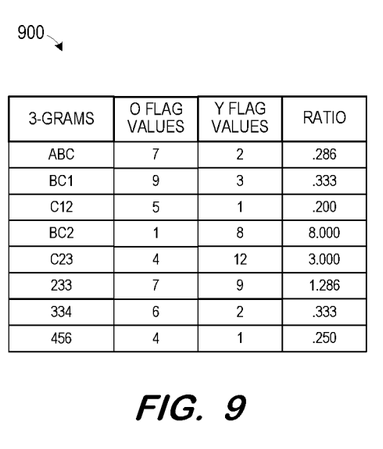
FIG. 9 is tabular representation of a data produced during generation of a model to output a flag value based on one or more n-grams according to some embodiments.

Next, at S850, first n-grams associated with a ratio of greater than a first threshold are determined. Similarly, at S860, second n-grams associated with a ratio of less than a second threshold are determined. S850 and S860 are intended to identify those n-grams which may be more predictive of a first flag value (S850) and those n-grams which may be more predictive of a second flag value (S860). With respect to the example of FIG. 9, it will be assumed that the first threshold is 2.0 and the second threshold is 0.3. Accordingly, n-grams "BC2" and "C23" are determined at S850 and n-grams "ABC", "C12" and "456" are determined at S860. In some embodiments, S850 comprises determination of first n-grams associated with the x largest ratios and S860 comprises determination of second n-grams associated with the y smallest ratios. Any criteria based on the ratios may be used to determine the first n-grams and the second n-grams at S850 and S860 in some embodiments.

At S870, a model is generated to determine a number of the first n-grams and a number of the second n-grams within an input segment and to output a flag value based on the determined numbers. In some embodiments, the first flag value is output if the number of the first n-grams within the input segment is greater than the number of the second n-grams within the input segment, and the second flag value is output if the number of the second n-grams within the input segment is greater than the number of the first n-grams within the input segment.

Returning to FIG. 6, and assuming that model 530 was generated according to process 800, model 530 operates to determine how many n-grams extracted from input segment 610 are members of the first n-grams identified at S850 and how many n-grams extracted from input segment 610 are members of the second n-grams identified at S860. Flag value 640 output by model 530 is the first flag value if the number of first n-grams is greater than the number of second n-grams.

Figure 10:
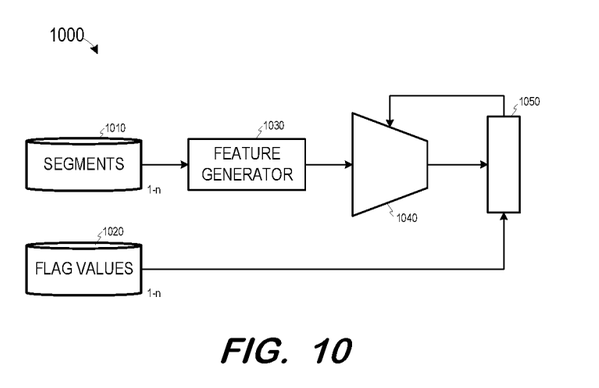
FIG. 10 is a diagram illustrating training of a neural network to output a flag value based on one or more n-grams according to some embodiments.

FIG. 10 illustrates model generation at S440 according to some embodiments. Architecture 1000 depicts training of neural network 1040 based on training segments 1010 and associated flag values 1020 acquired at S410. Feature generator 1030 generates features based on training segments 1010 and inputs the features into network 1040 during training. The features may comprise any of the n-gram-based features described above and/or any other features which may be derived from a text segment. According to some embodiments, network 1040 includes feature extraction functionality and feature generator 1030 is not used.

As is known in the art, loss layer 1050 evaluates a loss function which relates to a difference between the outputs of model 1040 and corresponding ground truth flag values 1020. Network 1040 is iteratively modified based on successive evaluations of the loss function in an attempt to optimize the loss function. Network 1040 may be deployed once the loss function is suitably optimized and the performance of the trained network 1040 with respect to test segments is determined to be satisfactory.

Figure 11:
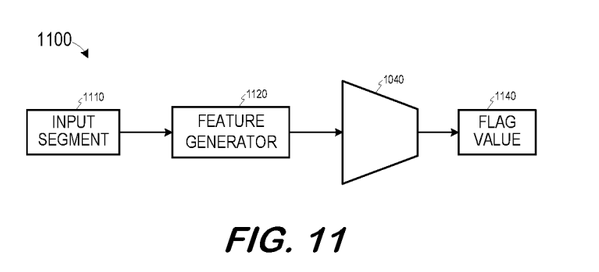
FIG. 11 is a diagram illustrating deployment of a trained neural network to output a flag value based on an input segment according to some embodiments.

FIG. 11 illustrates deployment of trained network 1140 according to some embodiments. Input segment 1110 may comprise a translated text, and feature generator 1120 generates features based on input segment 1110 for input to trained network 1140. Trained network 1140 outputs flag value 1140 based thereon. Flag value 1140 may be presented to a linguist for review along with input segment 1110 and proposed replacement text for input segment 1110. Alternatively, replacement of segment 1110 with the proposed replacement text may be automatically executed depending on flag value 1140 as described with respect to FIG. 3.

According to some embodiments, trained network 1140 is used to determine which features are the most important contributors to the determination of either flag value. For example, in a case that trained network 1140 is a support-vector machine (SVM), a coefficient associated with each feature may be extracted from trained network 1140 and used to determine a list of the most-important features for determination of flag value Y and the most-important features for determination of flag value O. SHapley Additive exPlantions (SHAP values) may be used in the case of other network types to determine the relative contribution of each input feature to the network output.

Referring back to FIG. 5, n-gram extraction component 520 may extract only those n-grams (or other features) which are deemed important to the determination of flag value Y (e.g., the top 10 relative contributors, all contributors having a relative contribution>threshold) and important to the determination of flag value O (e.g., the top 10 relative contributors, all contributors having a relative contribution>threshold), and ignore all other n-grams/features. Model 550 will therefore be generated based solely on these extracted features. At deployment, n-gram extraction component 620 similarly extracts only those n-grams/features which were previously determined as important and that were used to generate model 560. Such an implementation may provide for a simpler and easier to evaluate model, without unsuitably degrading model performance.

Figure 12:
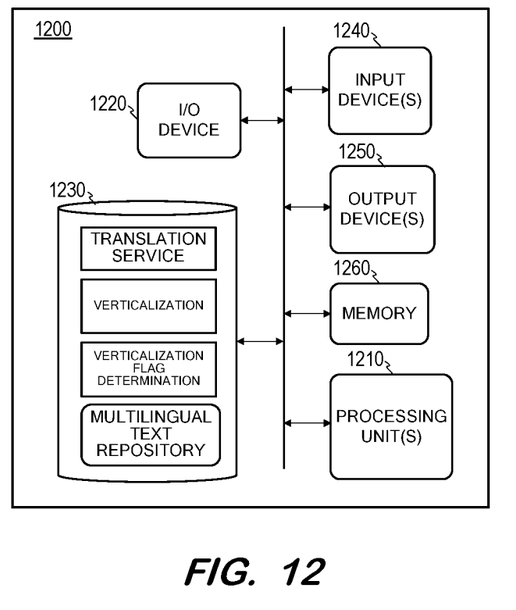
FIG. 12 is a block diagram of a hardware system providing training and inference management according to some embodiments.

FIG. 12 is a block diagram of a hardware system providing translation and verticalization according to some embodiments. Hardware system 1200 may comprise a general-purpose computing apparatus and may execute program code to perform any of the functions described herein. Hardware system 1200 may be implemented by a distributed cloud-based server and may comprise an implementation of application platform 200 or 300 in some embodiments. Hardware system 1200 may include other unshown elements according to some embodiments.

Hardware system 1200 includes processing unit(s) 1210 operatively coupled to I/O device 1220, data storage device 1230, one or more input devices 1240, one or more output devices 1250 and memory 1260. I/O device 1220 may facilitate communication with external devices, such as an external network, the cloud, or a data storage device. Input device(s) 1240 may comprise, for example, a keyboard, a keypad, a mouse or other pointing device, a microphone, a knob or a switch, an infra-red (IR) port, a docking station, and/or a touch screen. Input device(s) 1240 may be used, for example, to enter information into hardware system 1200. Output device(s) 1250 may comprise, for example, a display (e.g., a display screen) a speaker, and/or a printer.

Data storage device 1230 may comprise any appropriate persistent storage device, including combinations of magnetic storage devices (e.g., magnetic tape, hard disk drives and flash memory), optical storage devices, Read Only Memory (ROM) devices, and RAM devices, while memory 1260 may comprise a RAM device.

Data storage device 1230 stores program code executed by processing unit(s) 1210 to cause server 1200 to implement any of the components and execute any one or more of the processes described herein. Embodiments are not limited to execution of these processes by a single computing device. Data storage device 1230 may also store data and other program code for providing additional functionality and/or which are necessary for operation of hardware system 1200, such as device drivers, operating system files, etc.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation some embodiments may include a processor to execute program code such that the computing device operates as described herein.

Embodiments described herein are solely for the purpose of illustration. Those in the art will recognize other embodiments may be practiced with modifications and alterations to that described above.

What is claimed is:

1. A system comprising:
   a memory storing processor-executable program code;

a processing unit to execute the processor-executable program code to cause the system to:

acquire a plurality of text segments, each of the text segments associated with a flag value indicating whether the text segment is associated with a correct replacement text or an incorrect replacement text;

determine one or more n-grams of each text segment of the plurality of text segments;

generate, based on the one or more n-grams of each text segment and the flag value associated with each text segment, a model to determine a flag value based on one or more input n-grams;

receive an input text segment;

determine a second one or more n-grams of the input text segment;

using the model, determine an output flag value based on the determined second one or more n-grams; and present the input text segment and the output flag value on a display.

2. A system according to claim 1, wherein presentation of the input text segment and the output flag value comprises presentation of the input text segment, the output flag value, and a proposed replacement text associated with the input text segment.

3. A system according to claim 2, the processing unit to execute the processor-executable program code to cause the system to:

translate an original text segment of a first language to the input text segment, where the input text segment is of a second language; and determine the proposed replacement text based on the input text segment, where the proposed replacement text is of the second language.

4. A system according to claim 3, the processing unit to execute the processor-executable program code to cause the system to:

after presentation of the input text segment, the output flag value, and the proposed replacement text associated with the input text segment, receive an indication of whether or not to replace the input text segment with the proposed replacement text.

5. A system according to claim 1, wherein generation of the model comprises:

determine, for each of the one or more n-grams of each text segment, a first number of associations with a first flag value, and a second number of associations with a second flag value;

determine a first subset of the one or more n-grams to associate with the first flag value based on the first number of associations and the second number of associations for each n-gram of the first subset; and determine a second subset of the one or more n-grams to associate with the second flag value based on the first number of associations and the second number of associations for each n-gram of the second subset, wherein the model is to determine a number of the input n-grams which belong to the first subset and a number of the input n-grams which belong to the second subset, to output the first flag value if the number of the input n-grams which belong to the first subset is greater than the number of the input n-grams which belong to the second subset, and to output the second flag value if the number of the input n-grams which belong to the first subset is less than the number of the input n-grams which belong to the second subset.

6. A system according to claim 5, the processing unit to execute the processor-executable program code to cause the system to:

translate an original text segment of a first language to the input text segment, where the input text segment is of a second language; and determine the proposed replacement text based on the input text segment, wherein the proposed replacement text is of the second language, and wherein presentation of the input text segment and the output flag value comprises presentation of the input text segment, the output flag value, and the proposed replacement text.

7. A method comprising:

acquiring a plurality of text segments, each of the text segments associated with a flag value indicating whether the text segment is associated with a correct replacement text or an incorrect replacement text;

determining one or more n-grams of each text segment of the plurality of text segments;

generating, based on the one or more n-grams of each text segment and the flag value associated with each text segment, a model to determine a flag value based on one or more input n-grams;

receiving an input text segment;

determining a second one or more n-grams of the input text segment;

using the model, determining an output flag value based on the determined second one or more n-grams; and presenting the input text segment and the output flag value on a display.

8. A method according to claim 7, wherein presenting the input text segment and the output flag value comprises presentation of the input text segment, the output flag value, and a proposed replacement text associated with the input text segment.

9. A method according to claim 8, further comprising:

translating an original text segment of a first language to the input text segment, where the input text segment is of a second language; and determining the proposed replacement text based on the input text segment, where the proposed replacement text is of the second language.

10. A method according to claim 9, further comprising:

after presenting of the input text segment, the output flag value, and the proposed replacement text associated with the input text segment, receiving an indication of whether or not to replace the input text segment with the proposed replacement text.

11. A method according to claim 7, wherein generating the model comprises:

determining, for each of the one or more n-grams of each text segment, a first number of associations with a first flag value, and a second number of associations with a second flag value;

determining a first subset of the one or more n-grams to associate with the first flag value based on the first number of associations and the second number of associations for each n-gram of the first subset; and determining a second subset of the one or more n-grams to associate with the second flag value based on the first number of associations and the second number of associations for each n-gram of the second subset, wherein the model is to determine a number of the input n-grams which belong to the first subset and a number of the input n-grams which belong to the second subset, to output the first flag value if the number of the input n-grams which belong to the first subset is greater than the number of the input n-grams which belong to the second subset, and to output the second flag value if the number of the input n-grams which belong to the first subset is less than the number of the input n-grams which belong to the second subset.

12. A method according to claim 11, further comprising:
translating an original text segment of a first language to the input text segment, where the input text segment is of a second language; and
determining the proposed replacement text based on the input text segment,
wherein the proposed replacement text is of the second language, and
wherein presentation of the input text segment and the output flag value comprises presentation of the input text segment, the output flag value, and the proposed replacement text.

13. A non-transitory medium storing processor-executable program code executable by a processing unit of a computing system to cause the computing system to:
acquire a plurality of text segments, each of the text segments associated with a flag value indicating whether the text segment is associated with a correct replacement text or an incorrect replacement text;
determine one or more n-grams of each text segment of the plurality of text segments;
generate, based on the one or more n-grams of each text segment and the flag value associated with each text segment, a model to determine a flag value based on one or more input n-grams;
receive an input text segment;
determine a second one or more n-grams of the input text segment;
using the model, determine an output flag value based on the determined second one or more n-grams; and
present the input text segment and the output flag value on a display.

14. A medium according to claim 13, wherein presentation of the input text segment and the output flag value comprises presentation of the input text segment, the output flag value, and a proposed replacement text associated with the input text segment.

15. A medium according to claim 14, the processor-executable program code executable by a processing unit of a computing system to cause the computing system to:
translate an original text segment of a first language to the input text segment, where the input text segment is of a second language; and
determine the proposed replacement text based on the input text segment, where the proposed replacement text is of the second language.

16. A medium according to claim 15, the processor-executable program code executable by a processing unit of a computing system to cause the computing system to:
after presentation of the input text segment, the output flag value, and the proposed replacement text associated with the input text segment, receive an indication of whether or not to replace the input text segment with the proposed replacement text.

17. A medium according to claim 1, wherein generation of the model comprises:
determine, for each of the one or more n-grams of each text segment, a first number of associations with a first flag value, and a second number of associations with a second flag value;
determine a first subset of the one or more n-grams to associate with the first flag value based on the first number of associations and the second number of associations for each n-gram of the first subset; and
determine a second subset of the one or more n-grams to associate with the second flag value based on the first number of associations and the second number of associations for each n-gram of the second subset,
wherein the model is to determine a number of the input n-grams which belong to the first subset and a number of the input n-grams which belong to the second subset, to output the first flag value if the number of the input n-grams which belong to the first subset is greater than the number of the input n-grams which belong to the second subset, and to output the second flag value if the number of the input n-grams which belong to the first subset is less than the number of the input n-grams which belong to the second subset.

18. A medium according to claim 17, the processor-executable program code executable by a processing unit of a computing system to cause the computing system to:
translate an original text segment of a first language to the input text segment, where the input text segment is of a second language; and
determine the proposed replacement text based on the input text segment,
wherein the proposed replacement text is of the second language, and
wherein presentation of the input text segment and the output flag value comprises presentation of the input text segment, the output flag value, and the proposed replacement text.

* * * * *